United States Patent [19]

Kettell et al.

[11] Patent Number: 4,846,329
[45] Date of Patent: Jul. 11, 1989

[54] FRICTION ELEMENT FOR CLUTCH

[75] Inventors: John Kettell, Sheffield; David L. Whitmarsh, Nottingham, both of United Kingdom

[73] Assignee: GKN Sheepbridge Limited, Nottinghamshire, England

[21] Appl. No.: 170,142

[22] Filed: Mar. 21, 1988

[30] Foreign Application Priority Data

Mar. 24, 1987 [GB] United Kingdom ............... 87/6964

[51] Int. Cl.⁴ ..................... F16D 13/60; F16D 69/00
[52] U.S. Cl. ........................... 192/107 M; 192/70.14; 192/107 R; 188/218 XL
[58] Field of Search .......... 192/107 R, 107 M, 107 C, 192/70.14; 188/250 B, 218 XL, 73.1

[56] References Cited

U.S. PATENT DOCUMENTS

| | | | |
|---|---|---|---|
| 2,299,028 | 10/1942 | Nutt et al. | 192/107 C |
| 2,985,273 | 5/1961 | Binders | 192/107 C |
| 3,897,854 | 8/1975 | Norica | 192/107 C |
| 4,561,533 | 12/1985 | Roseto | 192/107 M |
| 4,565,274 | 1/1986 | Cameron | 192/107 R |

FOREIGN PATENT DOCUMENTS 858316 1/1961 United Kingdom .

Primary Examiner—Rodney H. Bonck
Assistant Examiner—Nicholas Whitelaw
Attorney, Agent, or Firm—Marshall, O'Toole, Gerstein, Murray & Bicknell

[57] ABSTRACT

A friction element to be secured to a hub member in a friction clutch, comprises a back plate (21) provided with a friction facing (23) on at least one side thereof, the friction facing (23) being of trefoil shape with a first lobe (24) extending radially inwardly and second and third lobes (25, 26) extending radially outwardly and in opposite circumferential directions from the first lobe. The shape of the friction facing provides a desirable distribution of material while using a minimum quantity thereof.

8 Claims, 2 Drawing Sheets

FRICTION ELEMENT FOR CLUTCH

BACKGROUND TO THE INVENTION

1. Field of the Invention

This invention relates to a friction element for use in a friction clutch. Friction elements of the kind to which the invention relates are used connected to a clutch hub member to form the driven element of a type of friction clutch widely used, for example, in the drive line of heavy duty motor vehicles.

2. Description of Prior Art

A typical clutch driven element has a plurality of friction elements disposed about the circumference of a clutch hub member, each friction element having a friction facing engagable with a driving element of the clutch. The friction facing may be of sintered metallic and/or ceramic material, and many shapes have been proposed for such friction facings. Viewed in the direction parallel to the rotational axis of the clutch hub member, the shape of most friction facings has been a portion of an annulus of the material.

An example of a proposed more complex shape for a friction facing is disclosed in GB No. 2 137 706, equivalent to U.S. Pat. No. 4,565,274 the friction facing having arcuate generally radially extending, circumferentially leading and trailing, faces. Apart from such arcuate edges, however, the configuration of the friction facing is generally part-annular as above referred to.

It has been found, however, that a friction facing of such a shape is unnecessarily wasteful of material, and does not have desirable operating characteristics in terms of maintaining a satisfactory performance across the whole radial extent of the friction facing. It is to be understood that when we use the terms radially and circumferentially herein, we use them in relation to the rotational axis of the clutch disc.

It will be appreciated that in use the speed at which rubbing occurs at the surface of a friction facing is greater at a greater distance from the axis of rotation of the clutch disc, so that there is a greater generation of heat and tendency for the friction material to wear at such greater distance. To control temperatures across the friction facing by effectively providing a greater heat sink capacity, and to give more even wear, the amount of friction material at portions thereof where the rubbing speed is greater must be greater than that where the speed is less.

SUMMARY OF THE INVENTION

It is the general object of the present invention to provide a friction element which more nearly meets the above described requirement for friction material disposition than friction elements generally known hitherto, whilst being economical in the quantity of friction material used. Other objects and advantages of the invention will be described hereafter.

According to the present invention, we provide a friction element comprising a backing plate for mounting to a clutch hub member to be rotatable in use about an axis and a friction facing provided on said backing plate, said friction facing being of a generally trefoil configuration and comprising a first radially inwardly extending lobe and second and third lobes extending radially outwardly and in opposite circumferential directions from said first lobe.

Such a shape of the friction facing on the friction element is economical in use of the friction material, and yet meets the fundamental requirement of providing a greater quantity of material at a radially outer position.

A further advantage of a friction element according to the invention is that the three lobes of the friction facing can be considered as having individual centres of area which are relatively widely spaced from one another on the backing plate. When engaged by a pressure plate under the action of a spring in a clutch, the pressure plate is supported by the friction facing at regions which are relatively widely spaced on the pressure plate. Considering a complete pressure plate in a clutch, engaging the facings of a number of friction elements disposed circumferentially about a clutch disc, the pressure plate is well supported around its circumferentially extending region which contacts the friction facings, without any relatively large areas of pressure plate left unsupported. Whilst friction facings of simpler configuration than the three-lobed shape according to the present invention could provide the same total area of friction facing, and meet the requirement for increasing circumferential extent with increasing radius, such shapes would leave larger parts of the pressure plate unsupported between the friction elements, leading to the possibility of distortion of the pressure plate.

The shape of the friction facing according to the invention thus provides a beneficial distribution of material in terms of circumferential extent relative to radial distance from the axis of rotation of the clutch disc, consistent with good support of the pressure plate as above described.

Preferably, over a substantial part of the radial extent of the friction facing, the dimension of the friction facing measured on arcuate lines centered on the axis of rotation of the clutch hub member in use, increases generally linearly within increasing distances of said lines from said axis.

The above described relationship need not apply at the radially outermost and innermost parts of the friction facing, since in order to impart the desired strength to the friction facing in the sense that the material thereof is not likely to break up in use, and will withstand handling during manufacturing processes, the end parts of the lobes thereof may be rounded. If the friction facing had a sharp corner, this could be vulnerable to damage.

Preferably generally radially extending edges of the friction facing, which face generally circumferentially and are the leading and trailing edges when the friction element is in use, are of curved concave configuration. Preferably also the radially outwardly facing, circumferentially extending edge of the friction facing is curved and concave between said second and third lobes of the friction facing.

BRIEF DESCRIPTION OF DRAWINGS

The invention will now be described by way of example with reference to the accompanying drawings, of which.

DESCRIPTION OF PREFERRED EMBODIMENTS

Figure 1:
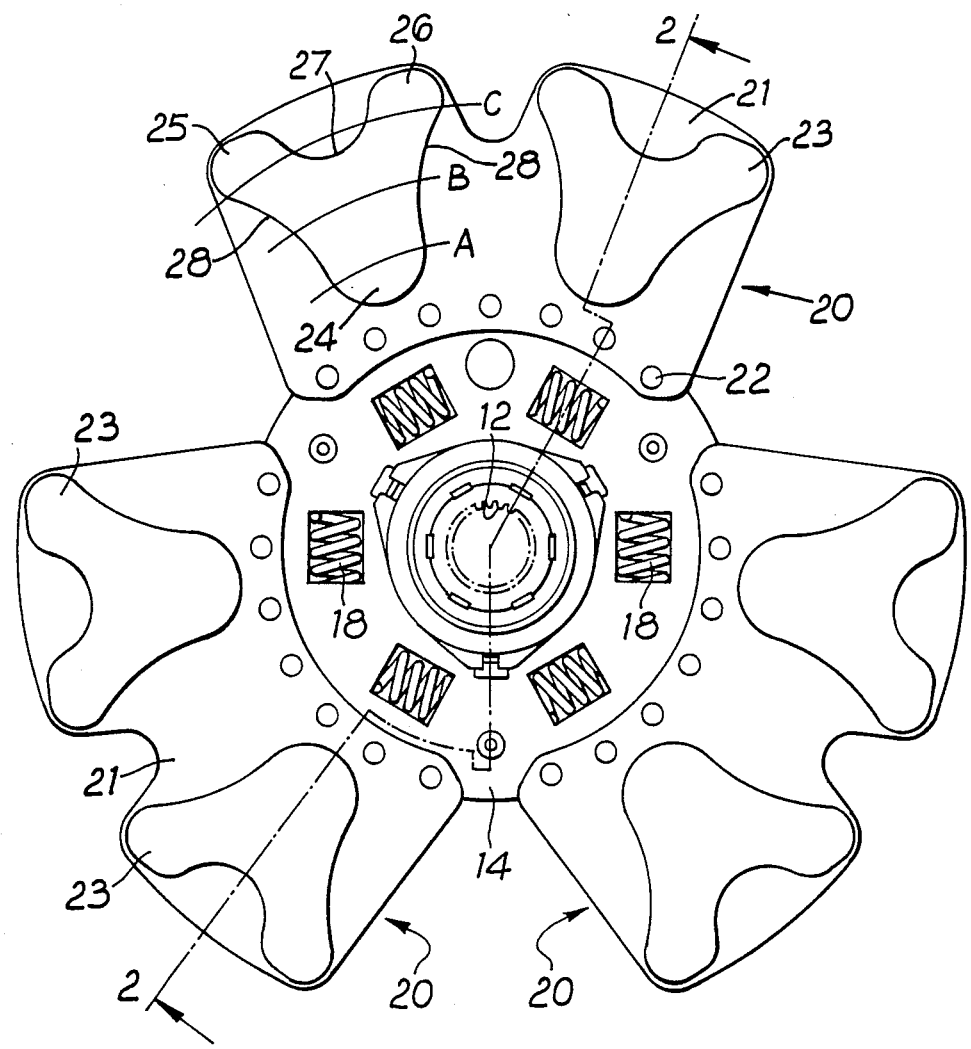
FIG. 1 is an axial view of a clutch driven element provided with friction elements according to the invention.
Figure 2:
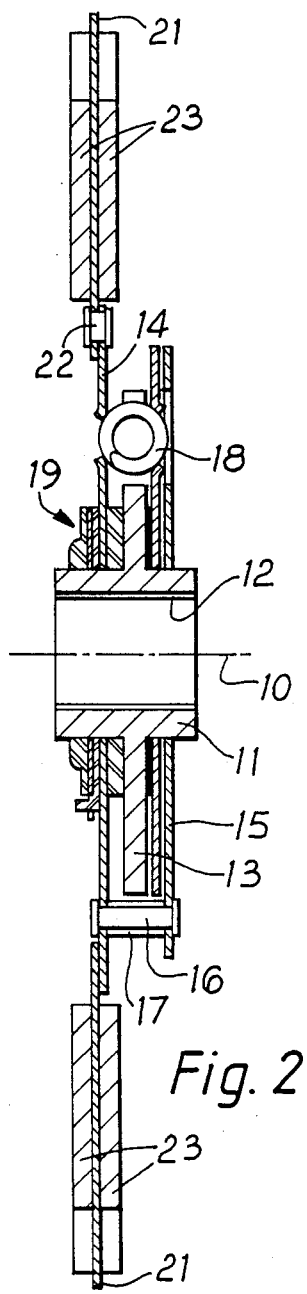
FIG. 2 is a section on the line 2—2 of FIG. 1.

Referring firstly to FIGS. 1 and 2 of the drawings, there is shown a clutch driven element which is intended for rotation about an axis 10. The central part or hub assembly of the clutch driven element is of a construction generally known for such elements, comprising a hub 11 with an internally splined bore 12 to be received on a splined shaft for torque transmission therewith. A flange 13 extends outwardly from the hub 11, and lies between and spaced from two axially spaced plates 14, 15 which are held together by circumferentially spaced rivets 16 passing through spacer sleeves 17. The hub 11 and the plates 14, 15 are capable of limited rotational movement relative to one another, this movement being controlled by circumferentially spaced springs 18 occupying aligned pockets in the plates 14, 15 and flange 13, such movement being damped by friction elements as generally indicated at 19 in the region of the hub 11. This is a generally known construction for the hub and associated parts of a clutch driven plate.

The plate 14 is provided with three circumferentially spaced friction element assemblies, indicated generally at 20. Each comprises a backing plate 21 held to the plate 14 by circumferentially spaced rivets 22. The backing plate is provided with two friction facings 23 on each side thereof. Each friction facing is preferably of a sintered metallic and/or ceramic material such as is generally known for use as friction facings, and is secured to the backing plate by being brazed thereto as part of the sintering process for its manufacture. Such a manufacturing process is generally known for such materials and friction facings, comprising broadly the process of forming the friction facing in the "green" state on the backing plate, and then sintering it in a suitable furnace.

Each friction facing 23 is of a trefoil shape, comprising (as described with reference to one of the facings) a first portion in the form of a lobe 24 which extends radially inwardly towards the axis of rotation of the clutch and second and third portions in the form of lobes 25, 26 which extend radially outwardly and circumferentially away from one another. Between the lobes 25, 26 the circumferentially extending, outwardly facing, edge of the friction facing presents a concave portion 27. Each of the lobes 24, 25, 26 has a rounded end portion, the radially innermost end of the lobe 24 being of somewhat larger radius than the outer end portions of the lobes 25, 26. The generally radially extending, circumferentially facing, edges 28 of the friction facing between the lobes 24, 25 and at 26 are concave.

On the friction facing described there are superimposed three circumferentially extending arcuate lines A, B, C at different radii thereon, centered on the axis 10. The shape of the friction facing gives an approximately linear increase in the circumferential extent of the facing, measured along these lines, with increasing radial distance from the axis of rotation 10. In the case of the line C, the circumferential extent of the friction facing comprises two portions where the lobes 25, 26 are intersected by the line.

The shape of the friction facing meets the above described desirable characteristic of having a circumferential extent which increases approximately linearly with distance from the axis of rotation of the clutch plate. This relationship, of course, applies only over the major part of the radial extent of the friction facing, since it is clearly not applicable at the extreme ends of the lobes 24, 25, 26. The rounded ends of these lobes have the effect that the friction facing is relatively robust, with no portions thereof unsupported by adjacent portions, so that the friction facing is not likely to break up or have parts become detached therefrom, either during manufacture or in use. Additionally, the configuration of the friction facing has the effect, as above described, that in a clutch the pressure plate is well supported.

Figure 3:
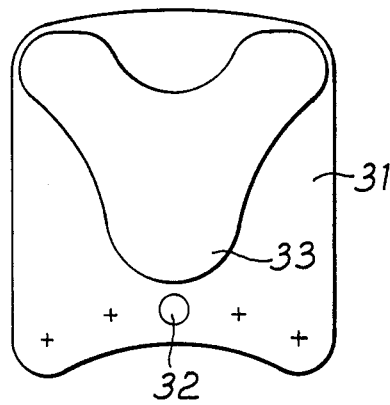
FIG. 3 is a view of a further embodiment of friction element according to the invention.

Referring now to FIG. 3 of the drawings, there is shown a modified form of friction element. This comprises a backing plate 31 provided with rivet holes 32 and a friction facing 33. The friction facing is of the same shape as above described with reference to FIG. 1. The element may have a correspondingly shaped friction facing on its opposite side. Four or six such friction elements may be used in a clutch plate.

Figure 4:
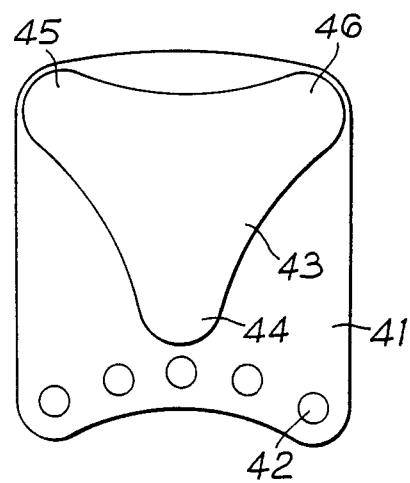
FIG. 4 a view of yet a further embodiment of friction element according to the invention.

FIG. 4 shows a friction element having a slightly different configuration of friction facing. The element comprises a backing plate 41 with rivet holes 42, and the friction facing 43 has first, second and third lobes 44, 45, 46. In this case, the concavity between the lobes 45, 46 is less marked than in the above described friction facings, whilst the lobe 45 is slightly narrower in its circumferential extent. The increase in circumferential extent of the friction facing with increasing distance from the rotational axis of a clutch element wherein the friction element is used is somewhat greater than a linear increase. Nevertheless, it provides the same general shape and the advantages consequent thereon.

We claim:

1. A friction element comprising a backing plate for mounting to a clutch hub member to be rotatable in use about an axis, and a friction facing provided on said backing plate, said friction facing being of a generally trefoil configuration and comprising a first radially inwardly extending lobe and second and third lobes extending radially outwardly from said first lobe and circumferentially away from one another.

2. A friction element according to claim 1 wherein, over a substantial part of the friction facing, the dimension of the friction facing measured on arcuate lines centered on said axis increases generally linearly with increasing distances of said lines from said axis.

3. A friction element according to claim 1 wherein generally radially extending, circumferentially facing, edges of the friction facing are curved and concave between the first and second lobes and between the first and third lobes.

4. A friction element according to claim 1 wherein a generally circumferentially extending, radially outwardly facing edge of the friction facing, is curved and concave between said second and third lobes.

5. A friction element according to claim 1 wherein said lobes have rounded end parts.

6. A friction element according to claim 1 comprising friction facings on opposite sides of said backing plate.

7. A friction element according to claim 1 wherein said friction facing is of a sintered metallic/ceramic material.

8. A clutch driven element comprising a clutch hub member rotatable about an axis, and a plurality of friction elements disposed therearound, each friction element comprising a backing plate secured to the hub member and a friction facing provided on said backing plate, said friction facing being of a generally trefoil configuration and comprising a first radially inwardly extending lobe and second and third lobes extending radially outwardly from said first lobe and circumferentially away from one another.

* * * * *